UNITED STATES PATENT OFFICE.

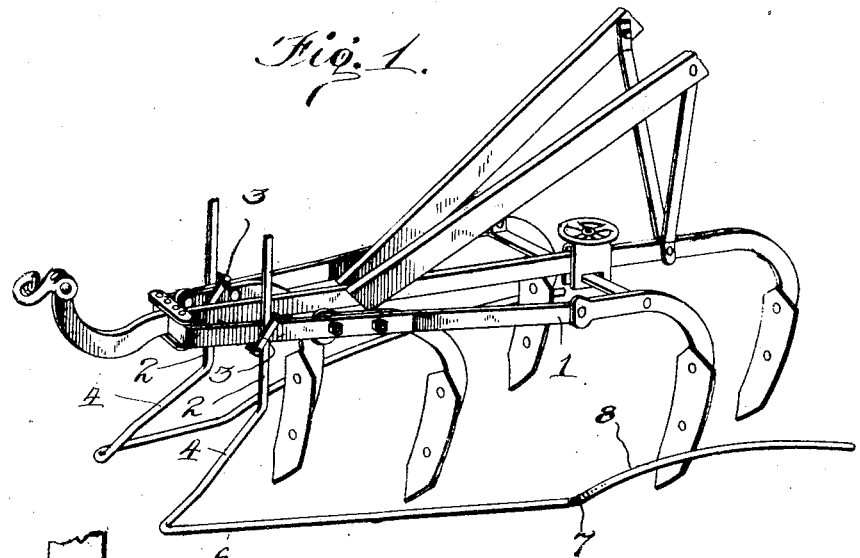
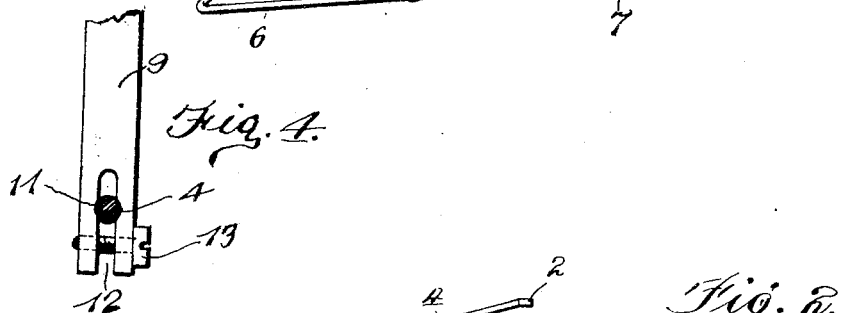
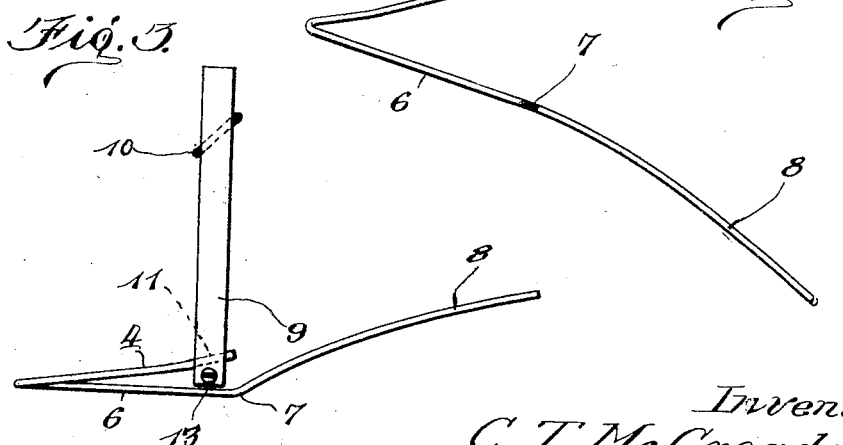

CHARLES T. McCREADY, OF ONLEY, VIRGINIA.

VINE TURNER AND LIFTER.

1,349,896.  Specification of Letters Patent.  Patented Aug. 17, 1920.

Application filed December 19, 1919. Serial No. 346,195.

*To all whom it may concern:*

Be it known that I, CHARLES T. McCREADY, a citizen of the United States, residing at Onley, in the county of Accomac and State of Virginia, have invented certain new and useful Improvements in Vine Turners and Lifters; and I do declare the following to be a full, clear, and exact description of the invention, such as will enable others skilled in the art to which it appertains to make and use the same.

This invention relates to improvements in cultivator attachments.

The principal object of the invention is to provide a simple and practical vine turner which may be readily attached to a cultivator of the usual construction.

With the above and other objects in view, the invention consists of the novel features of construction and the combination and arrangements of parts as will be more fully described.

I attain these objects by constructing a vine turner as illustrated in the accompanying drawings in which, Figure 1 is a perspective view showing the vine turner attached to a cultivator;

Fig. 2 is a top plan view of one section of the vine turner;

Fig. 3 is a side elevation of a modified form of attaching means; and,

Fig. 4 is an edge elevation of the lower end of the modified form of bar.

Similar reference numerals designate similar parts throughout the several views.

Reference is now had to the drawing in which the vine turner is shown applied to a cultivator of the usual construction comprising a pair of rearwardly diverging side bars 1.

The vine turner includes a pair of substantially V-shaped frames adapted to be positioned on the opposite sides of the cultivator frame. For the sake of clearness only one frame of the vine turner will be described in detail.

Each frame includes an attaching or supporting arm 2 which is preferably rectangular in cross section and is removably secured to one of the cultivator side bars by means of a suitable clamp 3. Extending forwardly and inclined downwardly from the lower end of the attaching arm 2 is a second arm 4 whose lower end is bent rearwardly substantially in a plane with the cultivator side bars to form a horizontally disposed arm 6, which when the device is being used, slides upon the surface of the ground. The rear end 7 of the arm 6 is inclined upwardly and curved outwardly from the shovels of the cultivator to form a guard 8 for the shovels.

It is well known that when cultivating the ground between rows of vegetables that the cultivator shovels frequently engage the vines and tear them or pull the vegetables out of the ground. When a cultivator is provided with a vine turner of the character herein described the vines will slide over the arms 6, and, upon reaching the bent or inclined ends 7 of the arms 6, will be moved out of the path of the cultivator shovels. It is readily seen that only by bending or inclining the arms 6 as indicated at 7, is it possible to properly lift the vines out of the path of the cultivator shovels. The guard 8 will assist in performing the operation just set forth.

In a modified form of the attaching arm 1 employ a bar 9 which may be removably mounted on a cultivator side bar at any desired point by means of a U-bolt 10. The lower end of the bar 9 is provided with a bore 11 extending longitudinally with relation to the cultivator, and with a slot 12 which opens into said bore. The arm 4 is insertible into this bore 11 and clamped therein by means of a screw 13 as shown in Fig. 4, said arm being longitudinally adjustable in the bore to provide a greater or less forward projection of the front end of the frame. The extent of projection is controlled by the depth of the list.

From the foregoing description taken in connection with the accompanying drawings, the construction and operation of the invention will be readily understood without requiring further explanation.

Various changes in the form, proportion, and minor details of construction may be resorted to without departing from the principle or sacrificing any of the advantages of the claimed invention.

I claim:

A vine turner attachment for cultivators comprising an arm for attachment to a cultivator side bar, a forwardly downwardly inclined extension on the lower end of said arm, a substantially horizontally disposed rearwardly extending arm on the lower end of said extension, and a substantially laterally curved upwardly inclined arm on the second named arm.

In testimony whereof I have hereunto set my hand.

CHARLES T. McCREADY.